(12) United States Patent
Wang

(10) Patent No.: US 6,642,858 B1
(45) Date of Patent: Nov. 4, 2003

(54) APPARATUS FOR INPUTTING OPENING AND CLOSING PARENTHESES SIMULTANEOUSLY BY SINGLE KEYSTROKE AND METHOD FOR THE SAME

(75) Inventor: Chin Ping Wang, Hsintien (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/134,374

(22) Filed: Apr. 30, 2002

(51) Int. Cl.[7] .............................................. H03K 17/94
(52) U.S. Cl. ........................................................ 341/22
(58) Field of Search ..................... 341/22, 26; 345/168, 345/172; 400/472, 476, 477

(56) References Cited

U.S. PATENT DOCUMENTS 6,359,572 B1 * 3/2002 Vale ............................ 341/22

* cited by examiner

Primary Examiner—Timothy Edwards
(74) Attorney, Agent, or Firm—Rosenberg, Klein & Lee

(57) ABSTRACT

An apparatus for inputting opening and closing parentheses simultaneously by a single keystroke and method for the same are proposed. The keyboard is augmented with a parenthesis key. The opening and closing parentheses are simultaneously input by pressing the parenthesis key, wherein the key codes for opening parenthesis, closing parenthesis and cursor right are successively generated. Therefore, opening and closing parentheses are simultaneously input and cursor is placed between the opening and closing parentheses to facilitate typing.

9 Claims, 3 Drawing Sheets

APPARATUS FOR INPUTTING OPENING AND CLOSING PARENTHESES SIMULTANEOUSLY BY SINGLE KEYSTROKE AND METHOD FOR THE SAME

FIELD OF THE INVENTION

The present invention relates to an apparatus for inputting opening and closing parentheses simultaneously and method for the same, especially to an apparatus for inputting opening and closing parentheses simultaneously by a single keystroke and method for the same.

BACKGROUND OF THE INVENTION

The conventional typing approach for generating opening parenthesis and closing parenthesis can be done either by directly typing the parenthesis or by a software-based approach. In the approach of directly typing, the most keyboards require simultaneously pressing the shift key and an opening parenthesis key (a closing parenthesis key) for inputting the opening parenthesis (the closing parenthesis). Alternatively, two dedicated keys used for the opening parenthesis and closing parenthesis only are successively pressed for inputting the opening parenthesis and the closing parenthesis. In the software-based approach, the user can click a symbol table in an application such as Microsoft Word to simultaneously input the opening parenthesis and the closing parenthesis. In Japanese keyboards, some keys are assigned with multiple characters and toggle keys are required to selectively input required character.

However, in the first approach, the keyboard lacks the ability of inputting opening and closing parentheses simultaneously by single keystroke. In the second approach, the symbol table is supported by specific applications and cannot be used for other applications. It is inconvenient for both approaches.

SUMMARY OF THE INVENTION

It is the object of the present invention to provide an apparatus for inputting opening and closing parentheses simultaneously by single keystroke and method for the same.

To achieve above object, the present invention provides a method for inputting opening and closing parentheses simultaneously by single keystroke, comprising following steps: (a). pressing a parenthesis key augmented on a keyboard; and (b). sending a pre-defined key code for an opening parenthesis and a pre-defined key code for a closing parenthesis.

To achieve above object, the present invention provides a keyboard for inputting opening and closing parentheses simultaneously by single keystroke. The keyboard has at least one parenthesis key thereon. The opening and closing parentheses are simultaneously input by pressing the parenthesis key.

The various objects and advantages of the present invention will be more readily understood from the following detailed description when read in conjunction with the appended drawing, in which:

DETAILED DESCRIPTION OF THE INVENTION

Figure 1:
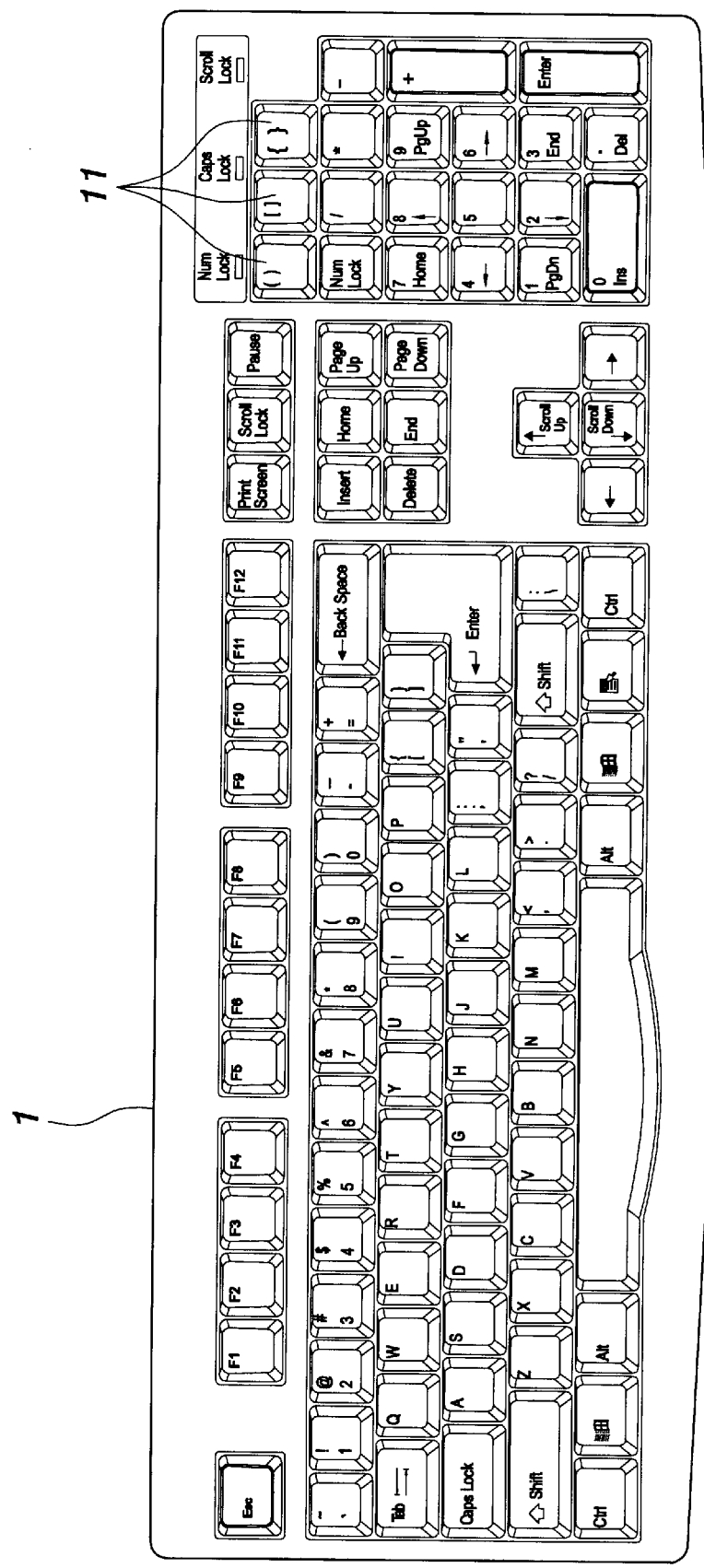
FIG. 1 shows a top view of a keyboard 1 using the apparatus for inputting opening and closing parentheses simultaneously according to the present invention.

FIG. 1 shows a top view of a keyboard 1 using the apparatus for inputting opening and closing parentheses simultaneously according to the present invention. The keyboard 1 has a plurality of parenthesis keys 11 for inputting opening and closing parentheses simultaneously. Moreover, the plurality of parenthesis keys 11 are corresponding to parenthesis of different forms such as ( ),{ }, and [ ].

Figure 2:
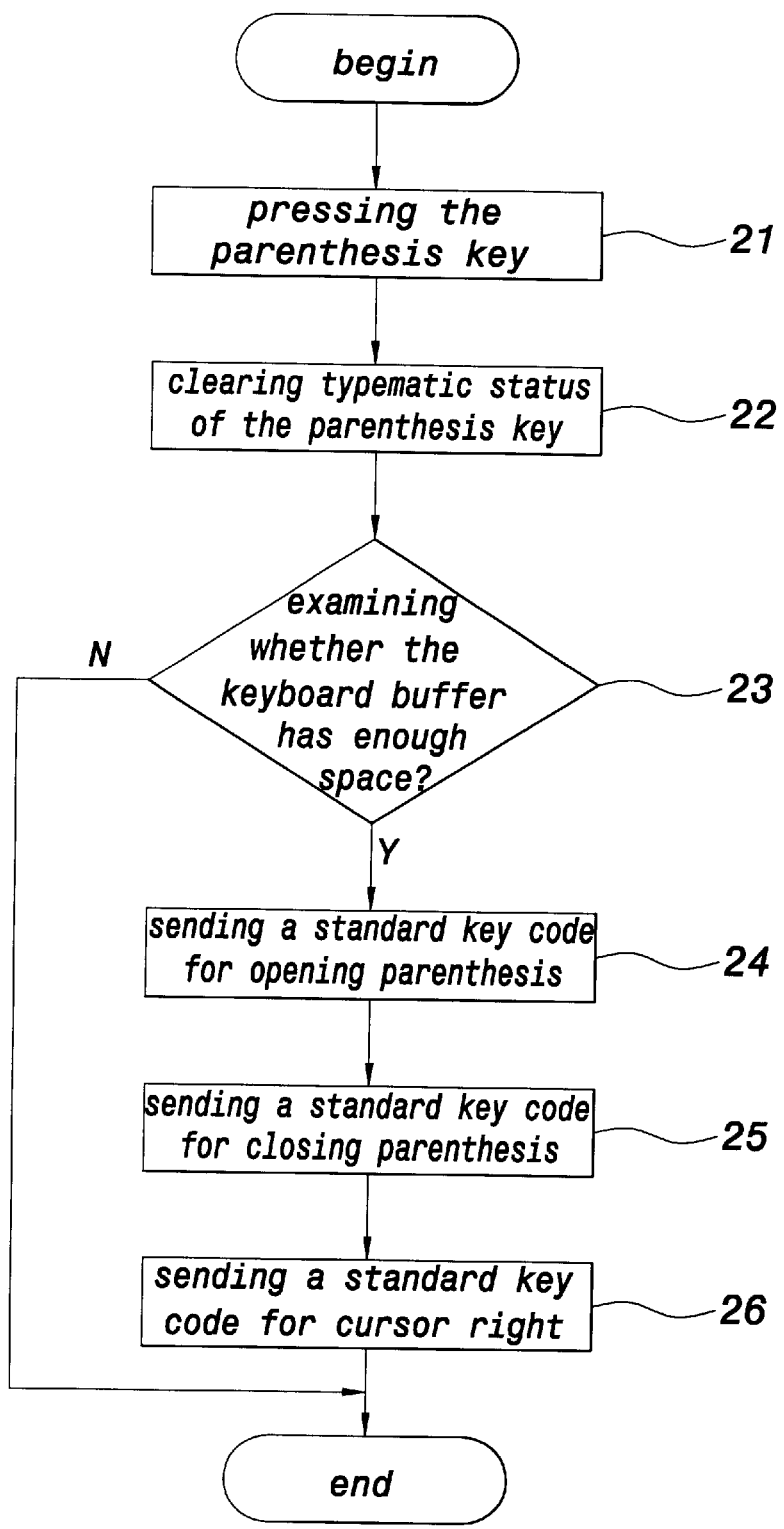
FIG. 2 shows the flowchart of the input method according to the first preferred embodiment of the present invention.

FIG. 2 shows the flowchart of the input method according to the first preferred embodiment of the present invention, the method comprising following steps:

step 21: pressing the parenthesis key;

step 22: clearing typematic status (a key becomes typematic as being held down and keyboard repeatedly sending corresponding keypress code to motherboard) of the parenthesis key to prevent from inputting repetitive parenthesis;

step 23: examining whether the keyboard buffer has enough space for storing the key code of the parenthesis key; If true, going to step 24, else finishing the process;

step 24: sending a standard key code for opening parenthesis including make code and break code;

step 25: sending a standard key code for closing parenthesis including make code and break code;

step 26: sending a standard key code for cursor right including make code and break code and finishing the process.

In the step 23, the remaining space of the keyboard buffer should be enough for storing the standard key code for opening parenthesis, closing parenthesis and cursor right to ensure integrity of key code for the parenthesis key 11 in steps 24, 25 and 26. The step 26 is intended to place the cursor to position between the opening and closing parentheses for the convenience of user input. Therefore, the user does not need to move the cursor after pressing the parenthesis key 11.

Figure 3:
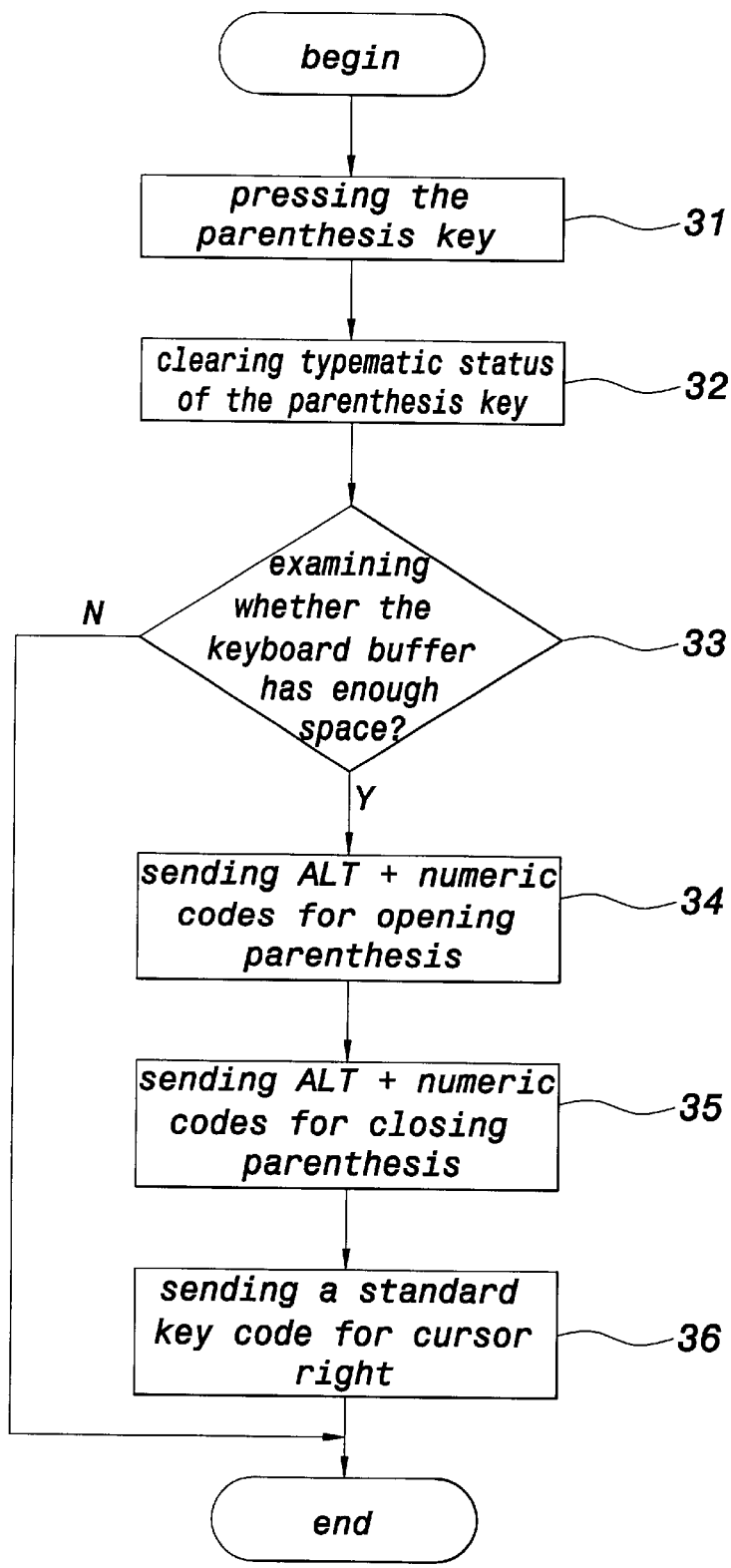
FIG. 3 shows the flowchart of the input method according to the second preferred embodiment of the present invention.

FIG. 3 shows the flowchart of the input method according to the second preferred embodiment of the present invention. In the first preferred embodiment of the present invention, the opening and closing parentheses are input by sending standard key codes. In the second preferred embodiment of the present invention, the opening and closing parentheses are input by ALT+numeric codes. The method according to the second preferred embodiment of the present invention comprises following steps:

step 31: pressing the parenthesis key;

step 32: clearing typematic status of the parenthesis key to prevent from inputting repetitive parenthesis;

step 33: examining whether the keyboard buffer has enough space for storing the key code of the parenthesis key; If true, going to step 24, else finishing the process;

step 34: sending ALT+numeric codes for opening parenthesis including make code and break code;

step 35: sending ALT+numeric codes for closing parenthesis including make code and break code;

step 36: sending a standard key codes for cursor right including make code and break code and finishing the process.

In the step 33, the remaining space of the keyboard buffer should be enough for storing the make code and break code for the parenthesis key 11 in steps 34, 35 and 36. In step 34, the numeric codes are 0040 to input opening parenthesis; in step 35, the numeric codes are 0041 to input closing parenthesis.

To sum up, the apparatus for inputting opening and closing parentheses simultaneously and method for the same according to the present invention have following advantages:

1. Inputting the opening and closing parentheses simultaneously by single keystroke.
2. The opening and closing parentheses are simultaneously input and the cursor is placed between the opening and closing parentheses to facilitate typing.
3. The opening and closing parentheses are simultaneously input by keyboard without involving software.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method for inputting opening and closing parentheses simultaneously by a single keystroke, comprising following steps:

(a). pressing a parenthesis key augmented on a keyboard;

(b). sending a pre-defined key code for an opening parenthesis and a pre-defined key code for a closing parenthesis.

2. The method for inputting opening and closing parentheses simultaneously by a single keystroke as in claim 1, wherein the keyboard in step (a) is a computer keyboard.

3. The method for inputting opening and closing parentheses simultaneously by a single keystroke as in claim 1, wherein the parenthesis key in step (a) is a key printed with a parenthesis sign.

4. The method for inputting opening and closing parentheses simultaneously by a single keystroke as in claim 1, further comprising a step of examining whether a keyboard buffer in the keyboard has enough space before step (b).

5. The method for inputting opening and closing parentheses simultaneously by a single keystroke as in claim 4, further comprising a step of clearing a typematic status of the parenthesis key before the step of examining the keyboard buffer.

6. The method for inputting opening and closing parentheses simultaneously by a single keystroke as in claim 1, wherein the pre-defined key codes are standard key codes in the step (b).

7. The method for inputting opening and closing parentheses simultaneously by a single keystroke as in claim 1, wherein the pre-defined key codes are ALT+numeric codes in the step (b).

8. The method for inputting opening and closing parentheses. simultaneously by a single keystroke as in claim 1, further comprising a step of sending a cursor right code after step (b).

9. The method for inputting opening and closing parentheses simultaneously by a single keystroke as in claim 8, wherein the cursor right code is a standard key code.

* * * * *